June 12, 1934.    T. BROWN    1,962,423
TRACTOR
Filed Sept. 13, 1930
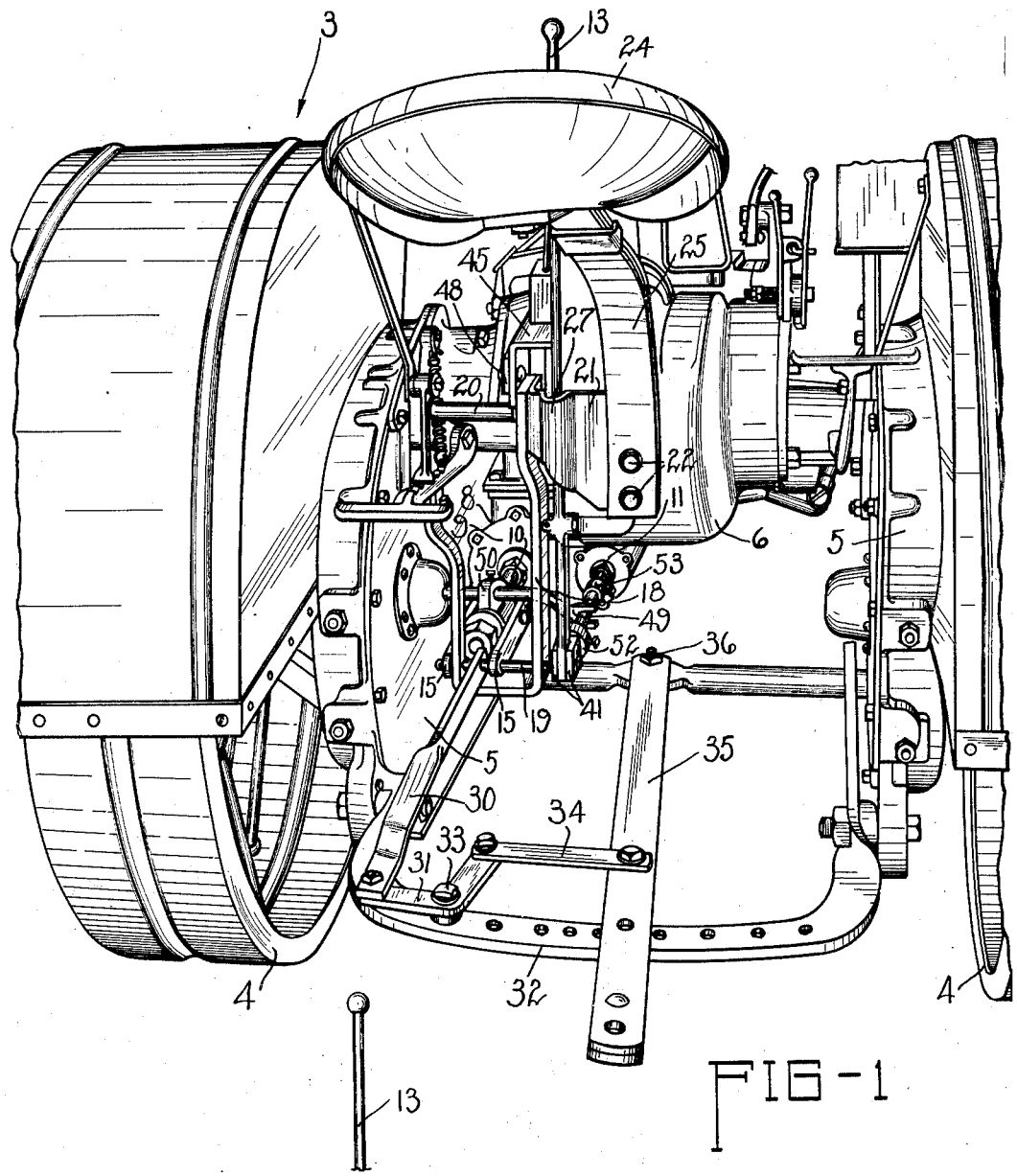
FIG-1
FIG-2
INVENTOR
THEOPHILUS BROWN.
By Brown, Jackson, Boettcher & Dienner
ATTORNEY
WITNESS
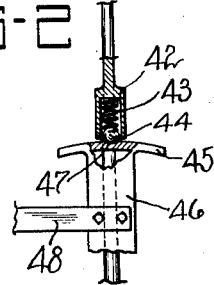

Patented June 12, 1934

1,962,423

UNITED STATES PATENT OFFICE 1,962,423

TRACTOR

Theophilus Brown, Moline, Ill., assignor to Deere & Company, Moline, Ill., a corporation of Illinois Application September 13, 1930, Serial No. 481,650

7 Claims. (Cl. 280—33.10)

The present invention relates generally to tractors and more particularly to those types of tractors which are provided with some form of power operated lift mechanism.

When tractors of the type usually found on farms are employed for the purpose of drawing various kinds of agricultural implements, the latter being usually connected to the tractor by means of some form of drawbar, it is frequently desirable to be able to shift the drawbar or other draft connections in order to shift the point of application of the draft to the implement being pulled. Especially is this true when the tractor is used for drawing a plow, particularly when operating on a hillside. In this case the ability to shift the drawbar, and hence the point of application of the draft force to the plow, from one side of the plow to the other is desirable in order to take care of the tendency of the plow to run down hill.

The principal object, therefore, of the present invention is the provision of an improved means for shifting the drawbar of the tractor from side to side for the purpose of adjusting the point of application of the draft force relative to the plow or other implement. Various types of hand operated mechanisms for accomplishing this result have been used, but the present invention particularly contemplates shifting the drawbar on the tractor from the power of the tractor motor. Farm tractors at the present time are usually provided with some form of lift mechanism, and one feature of the present invention is to utilize the power lift of the tractor for shifting the drawbar.

The particular type of lift mechanism preferably included in the present invention is one which is positively locked in either direction and in any position in which it is set. Thus the drawbar may be shifted to any position desired and securely held in that position.

It is to be understood, of course, that other types of power lift mechanism may be employed, depending upon the particular requirements as to the adjustability of the drawbar.

Other objects and advantages of the present invention will be apparent to those skilled in the art after a consideration of the following detailed description of the preferred embodiment thereof, taken in conjunction with the accompanying drawing in which:

Figure 1 is a rear perspective view of a tractor provided with a lift mechanism operated from the motor of the tractor, together with a swinging drawbar and connections between the drawbar and the power lift mechanism whereby the latter is operative to control the lateral position of the swinging drawbar on the tractor; and Figure 2 is a detail view illustrating a feature of the present invention wherein the manual control of the power lift mechanism is so constructed and arranged that the operator may know when the control mechanism is in its exact neutral position which locks the swinging drawbar in its adjusted position.

Referring now to the drawing, the reference numeral 3 indicates a tractor of the usual type having drive wheels 4, drive housings 5, and an axle housing 6 connecting the latter. The tractor is also provided with a power operated lift mechanism 8 preferably driven from the motor of the tractor. The power lift mechanism I have chosen for the purpose of illustrating my invention is one which is hydraulically operated from the motor on the tractor. Since the details of the power lift mechanism per se form no part of the present invention, they have not been completely shown in the accompanying drawing. It is sufficient to note that the power lift 8 includes a cylinder 9, a piston and piston rod structure 10 operatively associated therewith and adapted to be moved in either direction by the pressure created by a fluid pump driven from the motor of the tractor. Valve means 11 is provided for the purpose of optionally directing the pressure of the pump to either side of the piston structure 10 at will in order to actuate the power lift in either direction. The valve means 11 is manually controlled by means of a control lever 13 pivoted to the axle housing 6 and connected at its lower end with the valve means 11.

The valve means 11 has not been illustrated in detail since the valve means per se forms no part of the present invention, it being sufficient to say that when the control lever 13 is in an intermediate position, such as that shown in Figure 2, the valve means 11 is closed so that oil or other pressure transmitting fluid can neither enter nor leave the cylinder 9 of the power lift 8. Movement of the lever 13 in one direction operates to admit pressure to one side of the piston of the power lift thereby causing it to move in one direction, and movement of the lever 13 in the other direction causes pressure to be exerted upon the other side of the piston in cylinder 9 thereby moving the power lift in the other direction.

The piston rod of the piston structure 10 of the hydraulic lift mechanism is connected through a pair of links 15 to a U-shaped pendulum link or arm 18 by means of a pivoting bolt 19. The pendulum 18 is pivotally connected at its upper end to a pivoting bolt 20, which is positioned between the left hand drive housing 5 and a bracket 21, the latter being connected to the rear of the axle housing by means of bolts 22. An operator's station is provided on the tractor in the form of a seat 24 mounted upon a seat bar 25 which is clamped to the axle housing 6 by means of the same bolts 22 which secure the brackets 21 to the axle housing. The bracket 21 is formed with a curved portion 27 to accommodate the rearward movement of the control lever 13.

A link 30 is pivotally connected at its forward end to the pivoting bolt 19 and at its rearward end to one arm of a bell crank 31, which is pivoted upon the stationary drawbar 32 of the tractor by a pivot bolt 33. The other arm of the bell crank 31 is pivotally connected by means of a link 34 to the swinging drawbar 35 at a point between the ends thereof.

The structure just described provides motion transmitting linkage connections between the power lift 8 and the swinging drawbar 35 so that fore and aft movement of the power lift is effective to shift the position of the swinging drawbar laterally with respect to the tractor, the swinging drawbar 35 being pivoted to the tractor by means of a pivot bolt 36.

As stated above, the position of the piston structure 10, and therefore of the drawbar 35, is controlled through the control lever 13. The valve means 11 includes a valve stem 40 connected, as by links 41, to the lower end of the control lever 13. By operating the lever 13 in either one or the other direction, through the corresponding movements of the valve 11, the piston structure 10 is moved in either one or the other direction. When the lever 13 is moved in one direction, the piston structure 10 begins to move in the corresponding direction and which, through links 30 and 34 and the bell crank 31, causes the movement of the swinging bar 35. When the drawbar 35 has reached the desired position, the lever 13 is returned to its neutral position, closing the valve means 11, the drawbar 35 being then locked in the position to which it has been moved.

In order that the operator may know when the lever 13 is in its exact neutral position, this lever has been provided with a socket 42, which houses a spring 43, bearing on a ball bearing 44. Ball bearing 44 rolls on a track 45 provided on the upper end of a bracket 46. Track 45 has a depression 47 in the center thereof for receiving ball bearing 44 and holding the lever 13 in its neutral position. Bracket 46 is supported from the tractor through the member 48 connected to the tractor housing.

In order to prevent the piston of the hydraulic lift mechanism 8 from being forced up against either end of the cylinder 9, means are provided for forcing the valve stem 40 in the direction to stop further movement of the piston when it has reached either of its limiting positions. This means comprises of forked arm 49 which is affixed to the piston 10 by means of a trunnion block 50, the latter also serving to connect the links 15 to the piston structure 10. The fork 49 embraces the valve stem 40 and is adapted to be engaged by either of the collars 52 and 53. Thus when the piston structure 10 has been moved to its extreme position, either one direction or the other, the forked arm 49 will engage one of the collars 52 or 53 and thereby move the valve stem 40 to close the control valve thus locking the power lift and the swinging drawbar in that position.

While I have described, in conjunction with the accompanying drawing, the preferred embodiment of the present invention, it is to be understood that the present invention is not to be limited to the specific structure shown and described but that, in fact, widely different means may be employed in the practice of the broader aspects of my invention.

What I claim therefore and desire to secure by Letters Patent is:

1. In a tractor having a power actuated lift mechanism optionally operable in small increments and adapted to be held in any adjusted position, and a laterally shiftable drawbar, the combination of connections between said laterally shiftable drawbar and mechanism whereby the drawbar may be shifted laterally by operating said mechanism.

2. In combination with a tractor having an oscillatory power lift and a laterally shiftable drawbar, a pendulum link member pivoted to the tractor, means connecting said member to the power lift, and motion transmitting connections between the member and the laterally shiftable drawbar including parts disposed adjacent the plane of lateral movement of said drawbar.

3. In combination with a tractor having a power lift, an operator's seat support, a drive housing, a stationary drawbar and a swinging drawbar, a laterally extending bracket secured to the seat support, a pivoting bolt mounted on said drive housing and the bracket, a U-shaped pendulum link having its ends suspended from said bolt, operative connections from the power lift to the pendulum link, a bell crank pivoted on the stationary drawbar, and motion transmitting connections between said bell crank and the pendulum link and the swinging drawbar whereby fore and aft movement of the power lift is operative to effect lateral shifting of the swinging drawbar.

4. A tractor having an oscillatory power lift including a member controllably shiftable between two positions, a drawbar movably mounted on the tractor and also shiftable between two laterally spaced positions, and means operatively connecting said drawbar and member to control the lateral movement of the drawbar between said positions by said power lift.

5. A tractor having drive housings, a cross member carried thereby, a stationary drawbar pivotally secured to said cross member, a laterally swinging drawbar pivotally connected with said cross member, a power lift actuated by the power of the tractor and including a fore and aft oscillatory member, and means including a bell crank pivotally carried by said stationary drawbar for operatively connecting said oscillatory member with said swinging drawbar to control the latter from the power lift.

6. A tractor having a laterally swingable rearwardly extending drawbar, a power lift actuated by the power of the tractor and including an oscillatory member shiftable in a vertical plane relative to the tractor, a bell crank operatively connected with said drawbar and with said oscillatory member to control the drawbar from said power lift, and means pivotally supporting said bell crank on the tractor.

7. A tractor having a laterally swingable rearwardly extending drawbar, a transverse member connected with the tractor body and supporting the free end of said swinging drawbar, a power lift actuated by the power of the tractor and including a fore and aft oscillatory member, and means including a bell crank pivotally carried by said transverse member for operatively connecting said oscillatory member with said swinging drawbar to control the latter from the power lift.

THEOPHILUS BROWN.